US007822612B1

(12) United States Patent
Goodheart

(10) Patent No.: US 7,822,612 B1
(45) Date of Patent: Oct. 26, 2010

(54) METHODS OF PROCESSING A VOICE COMMAND FROM A CALLER

(75) Inventor: Eric Andrew Goodheart, Brighton, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1141 days.

(21) Appl. No.: 10/336,583

(22) Filed: Jan. 3, 2003

(51) Int. Cl.
*G10L 21/00* (2006.01)
*G10L 15/00* (2006.01)
*H04M 1/64* (2006.01)
*H04M 11/00* (2006.01)

(52) U.S. Cl. .............. 704/275; 704/231; 704/270.1; 379/88.01; 379/88.13

(58) Field of Classification Search ............ None
See application file for complete search history.

(56) References Cited

U.S. PATENT DOCUMENTS

| 4,882,685 | A | * | 11/1989 | van der Lely ............ 708/141 |
| 5,632,002 | A | * | 5/1997 | Hashimoto et al. ......... 704/231 |
| 6,122,357 | A | | 9/2000 | Farriss et al. |
| 6,178,403 | B1 | * | 1/2001 | Detlef .................... 704/270 |
| 6,219,638 | B1 | * | 4/2001 | Padmanabhan et al. ..... 704/235 |
| 6,353,836 | B1 | | 3/2002 | Bamford et al. |
| 6,356,868 | B1 | | 3/2002 | Yuschik et al. |
| 6,370,615 | B1 | | 4/2002 | Percival |
| 6,424,945 | B1 | * | 7/2002 | Sorsa .................... 704/270.1 |
| 6,766,320 | B1 | * | 7/2004 | Wang et al. ............... 707/5 |
| 7,110,952 | B2 | * | 9/2006 | Kursh ................... 704/270.1 |
| 7,137,126 | B1 | * | 11/2006 | Coffman et al. ........... 719/328 |
| 7,200,555 | B1 | * | 4/2007 | Ballard et al. ............ 704/235 |
| 7,315,613 | B2 | * | 1/2008 | Kleindienst et al. ....... 379/88.13 |
| 2002/0057678 | A1 | | 5/2002 | Jiang et al. |
| 2002/0059073 | A1 | | 5/2002 | Zondervan et al. |
| 2002/0093944 | A1 | | 7/2002 | Shen et al. |
| 2002/0099776 | A1 | | 7/2002 | Cafarella et al. |
| 2003/0125953 | A1 | * | 7/2003 | Sharma ................... 704/270 |
| 2003/0163321 | A1 | * | 8/2003 | Mault .................... 704/270 |
| 2004/0098266 | A1 | * | 5/2004 | Hughes et al. ............. 704/277 |
| 2007/0005366 | A1 | * | 1/2007 | Sravanapudi et al. ..... 704/270.1 |

OTHER PUBLICATIONS

Voice Extensible Markup Language (VoiceXML) Version 2.0, http://www.w3.org/TR/voicexml20, Apr. 24, 2002, (1 page).
Voice Activated Communications for Cellular and Corded Telephones, http://www.liveabled.com/manual/Communication%20Devices.htm, Jul. 16, 2002, (2 pages).
MVC Product Comparison and Product Information, http:/www.mathtalk.com/products.htm, Jul. 16, 2002, (4 pages).

(Continued)

*Primary Examiner*—Matthew J Sked

(57) ABSTRACT

Schemes for processing a voice command from a caller are disclosed herein. The schemes may allow a caller to manipulate data using a voice command and designate a device to which to provide the manipulated data. The schemes may be accessed over telecommunication networks. According to one exemplary embodiment, a method of processing a voice command from a caller may include receiving from the caller a voice command to manipulate a set of data. The voice command may be processed using a voice-recognition application. The set of data may be manipulated to obtain a different modified set of data, and the modified set of data may be provided to a device designated by the caller.

27 Claims, 2 Drawing Sheets

OTHER PUBLICATIONS

The Calculator with Voice Input, http://www.sakrament-speech.com/products/asr/asr1, Jul. 16, 2002 (1 page).

The Newest Voice Recognition Organizer Designed for the Blind and Visually Handicapped http://www.microscience.on.ca/CSvoice_mate.htm, Jul. 16, 2002 (5 pages).

The Voice Mate Hand Held Voice Recognition Digital Organizer http://www.redwhiteandblue.org/parrot/VMATE.HTM, Jul. 16, 2002 (5 pages).

Ability Forum Assistive Device Shop, http://www.abilityforum.com/store/AFDeviceShop2.htm, Jul. 16, 2002 (5 pages).

IMP The improved Voice Diary, http://www.voicediary.com/black.htm, Jul. 16, 2002 (5 pages).

Gus Multimedia Speech System, http://www.gusinc.com/speechsystem.html, Jul. 16, 2002 (5 pages).

We Make Reading Easy! Talking Calculator—It's Free!, http://www.premier-programming.com/content/Talking%20Calc.html, Jul. 16, 2002 (2 pages).

Give your customers a voice, http://www.bevocal.com/corporateweb/index.html, Jul. 29, 2002, (1 page).

Bevocal Overview, http://www.bevocal.com/corporateweb/telecom_solutions/index.html, Jul. 29, 2002 (2 pages).

Bevocal Voice Portal, http://www.bevocal.com/corporateweb/telecom_solutions/total_voice_portal/index.html, Jul. 29, 2002 (2 pages).

VXML Calculator, http://groups.google.com/groups?q=VXML+calculator&hl=en&lr=&ie=UTF-8&client=yhoo, Jul. 16, 2002 (2 pages).

Orange Launces Wildfire into Mass-Market Orbit, article dated Jul. 19, 1999, http://www.wildfire.com/news_id=8&archive=t, accessed on Dec. 13, 2002 (2 pages).

Sprint PCS, First in the Nation to Introduce Wireless Network-Based, Voice-Independent Dialing and Information Services Nationwide, article dated Aug. 2000, http://www.medialink.com/medialink/00-331.shtml, accessed on Dec. 13, 2002 (2 pages).

Talk it Up With Sprint PCS Voice Command, article dated Nov. 7, 2000, http://www.pcmag.com/article2/0,4149,28578,00.asp, accessed on Dec. 13, 2002 (5 pages).

Who is Wildfire?, http://www.orange.co.uk/wildfire/index.html, Dec. 2, 2002, (9 pages).

Phone Banking, http://www.americanstatebank.net/phonebank.htm, Jul. 16, 2002 (2 pages).

Speech Recognition Grammar Specification Version 1.0, http://www.w3.org/TR/grammar-spec, Jun. 28, 2002, (1 page).

* cited by examiner

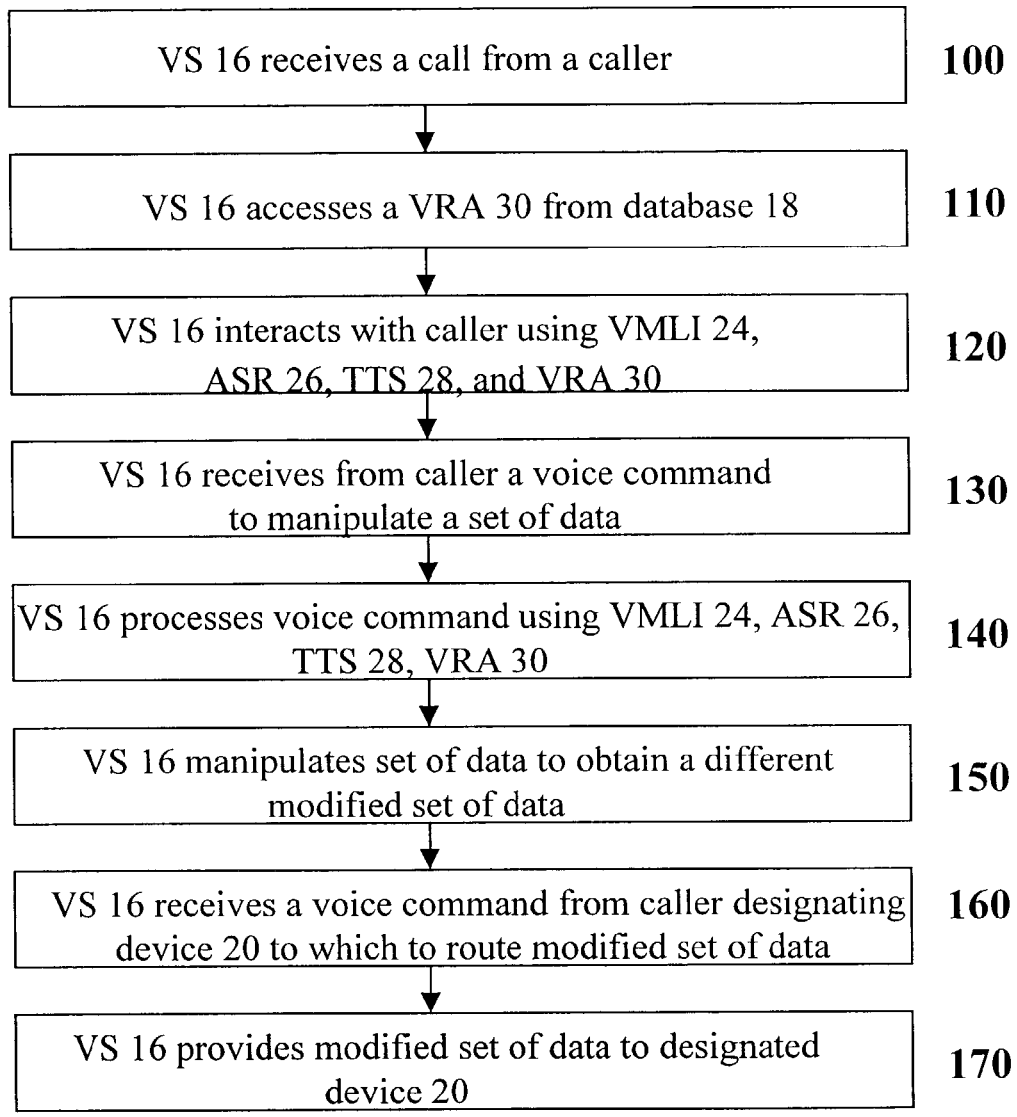

METHODS OF PROCESSING A VOICE COMMAND FROM A CALLER

BACKGROUND (1) Field

The present disclosure relates to voice-recognition systems that may be accessed over a telecommunication network.

(2) Description of Prior Art

A variety of systems that use voice-recognition technology to provide access to information over telecommunication networks are currently available. For example, many systems allow a caller to use a voice command to access information stored on the Internet. These systems do not permit a caller to manipulate data using a voice command and designate a device to which to direct the manipulated data, thereby inhibiting their degree of utility.

SUMMARY

Schemes for processing a voice command from a caller are described herein. The schemes may allow a caller to manipulate data using a voice command and designate a device to which to provide the manipulated data. The schemes may be accessed over telecommunication networks.

According to one exemplary embodiment, a method of processing a voice command from a caller may include receiving from the caller a voice command to manipulate a set of data. The voice command may be processed using a voice-recognition application. The set of data may be manipulated to obtain a different modified set of data, and the modified set of data may be provided to a device designated by the caller.

In one aspect of the exemplary embodiment, receiving the voice command may include accessing a voice-recognition application based on at least one of a grammar, a natural language, and a voice markup language.

In one aspect of the exemplary embodiment, processing the voice command may include converting the voice command to a symbolic command in a voice markup language. Manipulating the set of data may include executing the symbolic command.

In one aspect of the exemplary embodiment, providing the modified set of data may include directing the modified set of data to the device designated by the caller based on a protocol including at least one of a Public Switched Telephone Network (PSTN) protocol and an Internet protocol.

In one aspect of the exemplary embodiment, providing the modified set of data may include directing the modified set of data to at least one of a calling device, a display, an electronic mail account, a personal computer (PC), a personal digital assistant (PDA), and a printer.

In one aspect of the exemplary embodiment, providing the modified set of data may include providing the modified set of data to a device from which the caller originated the voice command.

In one aspect of the exemplary embodiment, providing the modified set of data may include converting the modified set of data to a voice output and providing the voice output to the device from which the caller originated the voice command.

According to one exemplary embodiment, the method may include receiving a voice command from the caller designating the device to receive the modified set of data.

According to one exemplary embodiment, the method may include providing an organizer application that allows the caller to manipulate data therein using the voice-recognition application.

According to one exemplary embodiment, the method may include providing an organizer application that allows the caller to manipulate data included in at least one of an account book, an address book, an alarm, a calculator, a clock, a date book, and a memorandum book using the voice-recognition application.

According to one exemplary embodiment, the method may include providing an organizer application that allows the caller to manipulate data included in a calculator, the calculator being capable of performing at least one of a macroinstruction, a unary operation, and a binary operation.

According to one exemplary embodiment, the method may include concurrently performing the method for a plurality of callers.

According to one exemplary embodiment, the method may include prompting a caller to choose from a plurality of available services capable of modifying a set of data. A voice-recognition application may be accessed in response to a service chosen by the caller. A voice command to manipulate a set of data may be received from the caller, and a voice command from the caller may be processed using the voice-recognition application. The set of data may be manipulated to obtain a different modified set of data, and the modified set of data may be provided to a device designated by the caller.

In one aspect of the exemplary embodiment, providing the modified set of data may include directing the modified set of data to at least one of a calling device, a display, an electronic mail account, a PC, a PDA, and a printer.

According to one exemplary embodiment, the method may include concurrently performing the method for a plurality of callers, in which two callers choose different services.

A method of processing a command from a caller is also disclosed herein. According to one exemplary embodiment, the method may include receiving from the caller a command to manipulate a set of data. The command may be processed using a media platform. The set of data may be manipulated to obtain a different modified set of data, and the modified set of data may be provided to a device designated by the caller.

In one aspect of the embodiment, receiving a command may include receiving at least one of a voice command, a dial tone modulation frequency (DTMF) tone command, and a text command.

In one aspect of the embodiment, receiving a command may include receiving a text command based on an Internet protocol.

In one aspect of the embodiment, processing the command may include processing the command using a media platform including a lexical parser.

In one aspect of the embodiment, providing the modified set of data may include based on the modified set of data, generating an output in a medium different than that of the command, and providing the output to the device designated by the caller.

A processor program stored on a processor-readable) medium and including instructions to cause a processor to process a voice command from a caller is also disclosed herein. According to one exemplary embodiment, the processor program may include instructions to cause a processor to receive from the caller a voice command to manipulate a set of data; process the voice command using a voice-recognition application; manipulate the set of data to obtain a different modified set of data; and, provide the modified set of data to a device designated by the caller.

A system for processing a voice command from a caller is also disclosed herein. According to one exemplary embodiment, the system may include an interface for receiving from the caller a voice command to manipulate a set of data; a voice-recognition application for processing the voice command; a voice markup language interpreter for manipulating the set of data to obtain a different modified set of data; and, a router for providing the modified set of data to a device designated by the caller.

BRIEF DESCRIPTION OF THE DRAWINGS

FIG. 2 is a flow chart illustrating a method for processing a voice command from a caller in accordance with an exemplary embodiment of the present invention.

DETAILED DESCRIPTION

Figure 1:
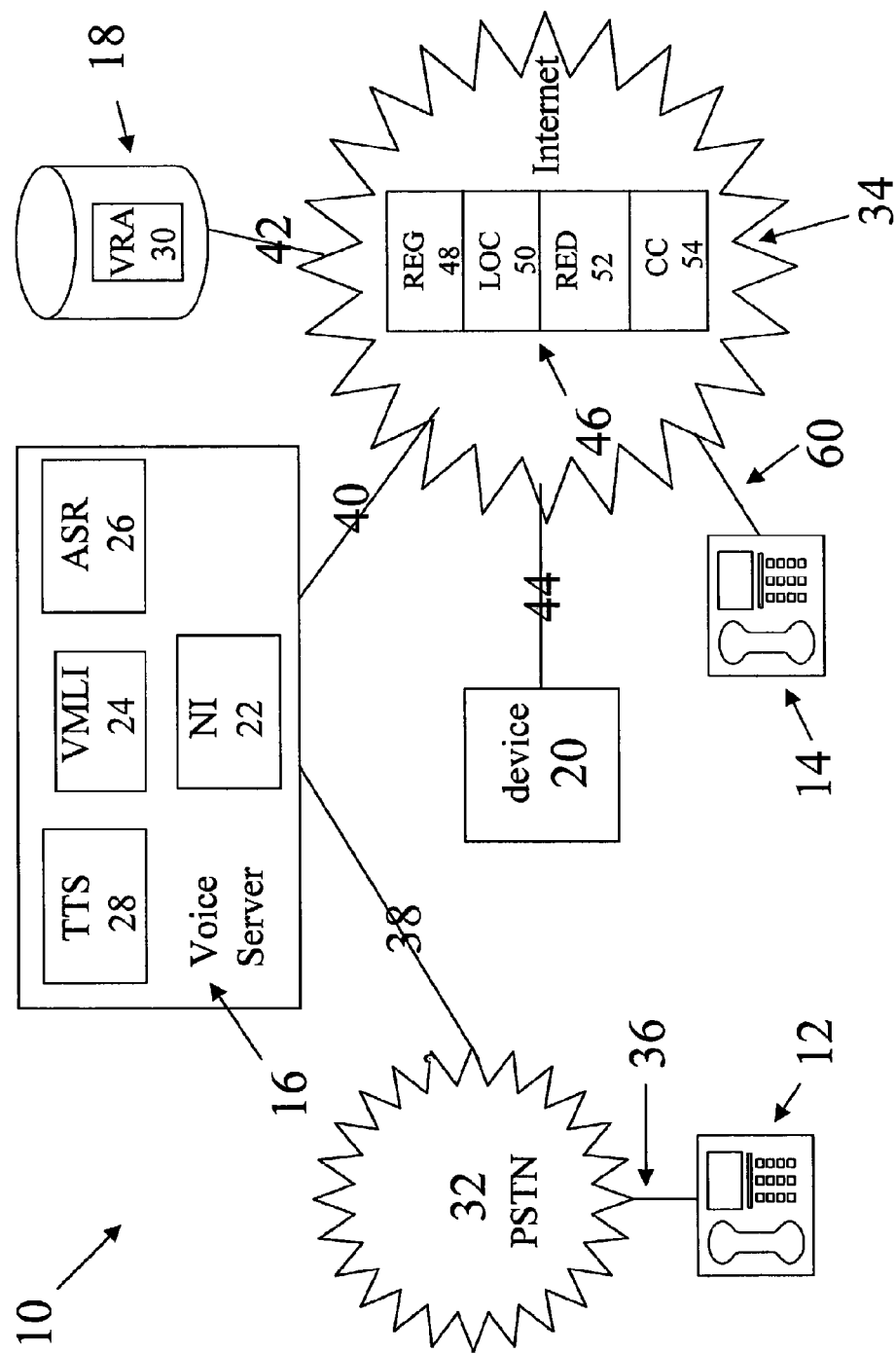
FIG. 1 illustrates a system for processing a voice command from a caller in accordance with an exemplary embodiment of the present invention.

A variety of acronyms are used in the following detailed description. For reference, these acronyms and their meanings are reproduced here.
    AIN: Automated Intelligent Network
    ASR: Automatic Speech Recognizer
    BNF: Bachus Naur Form
    CCIS: Common Channel Interoffice Signaling
    CPE: Customer Premises Equipment
    DTMF: Dial Tone Modulation Frequency
    HTML: Hypertext Markup Language
    HTTP: Hypertext Transfer Protocol
    IP: Internet Protocol
    JDBC: Java Database Connectivity Protocol
    JSP: JavaServer Page
    LDAP: Lightweight Directory Access Protocol
    MGCP: Media Gateway Control Protocol
    NI: Network Interface
    OCI: Oracle Call Interface
    ODBC: Open Database Connectivity Protocol
    OE: Office Equipment
    PC: Personal Computer
    PDA: Personal Digital Assistant
    PRI: Primary Rate Interface
    PSTN: Public Switched Telephone Network
    SALT: Speech Application Language Tags
    SIP: Session Initiation Protocol
    SLM: Statistical Language Model
    SMTP: Simple Mail Transfer Protocol
    SR: Speech Recognition
    SS7: Signaling System 7
    TTS: Text-to-Speech
    UA: User Agent
    URI: Uniform Resource Identifier
    URL: Uniform Resource Locator
    VML: Voice Markup Language
    VMLI: Voice Markup Language Interpreter
    VoiceXML: Voice Extensible Markup Language
    VoIP: Voice over Internet Protocol
    VRA: Voice-recognition application
    VS: Voice Server
    WAP: Wireless Access Protocol Generally, the schemes for processing voice commands described herein can process a command received from a caller over a telecommunication network. The schemes described herein can process a variety of different types of commands, including commands based on dial tone modulation frequency (DTMF), and/or text, and/or voice. The schemes described herein can execute the commands and provide the results of the executed commands to devices designated by the caller and/or to other applications.

Generally, the schemes described herein can be implemented on a variety of different telecommunication networks, including, for example, the conventional public switched telephone network (PSTN), the Internet, private networks, and/or other networks. The schemes described herein can be designed to receive a command over telephony channels, Internet Protocol (IP) channels, and/or messaging and/or signaling and/or data transport channels. The schemes described herein can process commands originating on a first network and terminating on a different second network.

Certain exemplary embodiments will now be described to provide an overall understanding of the schemes for processing voice commands described herein. One or more examples of the exemplary embodiments are shown in the drawings. Those of ordinary skill in the art will understand that the schemes for processing voice commands described herein can be adapted and modified to provide devices, methods, schemes, and systems for other applications, and that other additions and modifications can be made to the schemes described herein without departing from the scope of the present disclosure. For example, components, features, modules, and/or aspects of the exemplary embodiments can be combined, separated, interchanged, and/or rearranged to generate other embodiments. Such modifications and variations are intended to be included within the scope of the present disclosure.

FIG. 1 illustrates a system 10 for processing a voice command from a caller in accordance with an exemplary embodiment of the present invention. Generally, system 10 may implement a service for executing a voice command from a caller and providing a resulting response of the executed voice command to a device designated by the caller. In one embodiment, system 10 may implement a service for receiving from a caller a voice command to manipulate a set of data, manipulating a set of data to obtain a different modified set of data, and providing the manipulated set of data to a device designated by the caller.

System 10 may include calling devices 12, 14, a voice server (VS) 16, a database 18, and a device 20 which may be designated by the caller. Calling device 12 and VS 16 may be connected to a first network 32 over respective links 36 and 38. Calling device 14, VS 16, database 18, and device 20 may also be connected to a second network 34 over respective links 60, 40, 42, and 44.

A variety of conventional networks may be used to implement first network 32. In one embodiment, first network 32 may include the conventional PSTN. PSTN 32 may include a Common Channel Interoffice Signaling (CCIS) network for carrying a variety of signaling messages. Also, PSTN 32 may operate in accord with a conventional signaling protocol, e.g. the signaling protocol commonly known as Signaling System 7 (SS7). PSTN 32 may use Automated Intelligent Network (AIN) call processing. Details of AIN call processing may be found in U.S. Pat. No. 6,122,357 to Farris et al., the contents of which patent are expressly incorporated by reference herein.

A variety of conventional networks may also be used to implement second network 34. Second network 34 may include a network based on IP. The second network may include a network capable of processing a call using Voice over Internet Protocol (VoIP) or another conventional protocol for transforming a voice input into IP data. VoIP is a generic term for a telephony protocol that can use the Internet as a transport medium. Embodiments of VoIP include Session Initiation Protocol (SIP) and the call signaling and call control standard commonly referred to as H323. In one embodiment, second network 34 may include the Internet. In another embodiment, second network 34 may include a private network that restricts access by the public. In such an embodiment, a network administrator may restrict access to VS 16 to authorized users. In another embodiment, second network 34 may include a combination of a public network and a private network. For example, VS 16 may be connected to a public network portion of second network 34, and database 18 may be connected to a private network portion of second network 34.

Calling devices 12, 14 may include a conventional analog telephone or a conventional digital telephone. Calling devices 12, 14 may also include a telephone based on a wireless system, for example, a cellular telephone, or a telephone based on a satellite system. Calling devices 12, 14 may include a conventional so-called smart phone, such as a personal computer (PC) phone, a SIP phone, and an H323 phone, which can process signals based on voice and/or DTMF tones. Calling devices 12, 14 may also include a Wireless Access Protocol (WAP) client, such as a cellular telephone, a Personal Digital Assistant (PDA), and a HyperText Transfer Protocol (HTTP) client, such as an Internet browser, which can process signals based on text.

Calling devices 12, 14 may be respectively connected to PSTN 32 and Internet 34 over links 36, 60. Links 36, 60 may include a conventional telephone line, a cable television line, a Digital Subscriber Line (DSL), an Integrated Services Digital Network (ISDN) line, and/or another conventional communications line. For example, calling device 12 may be connected to first network 32 via a base station and a switch, such as a base station and a switch for a cellular telephone.

PSTN 32 and Internet 34 may be connected to VS 16 over respective links 38, 40. VS 16 may include a network interface (NI) 22 for receiving an incoming call from links 36, 38. NI 22 may include a conventional telephone network interface card, a SIP user agent (UA), an interface based on media gateway control protocol (MGCP), and/or an interface based on H323. Links 38, 40 may include a combination of a digital link capable of providing two-way voice-grade-type telephone communications and a signaling channel capable of transporting signaling messages in two directions. In one embodiment, links 38, 40 may include a combination of a T1 line and a simplified message desk interface (SMDI) link. Links 38, 40 can also include a primary rate interface (PRI) type ISDN line.

Internet 34 may be connected to database 18 and device 20 over respective links 42, 44. As explained below, database 18 may persist data or otherwise provide storage for one or more voice-recognition applications (VRAs) 30. Generally, device 20 may include a Customer Premises Equipment (CPE) device. Device 20 may include at least one of a calling device, a display, an electronic mail account, a PC, a PDA, and a printer. The PC and the printer may be networked-based, and the PDA may be Internet-based. Device 20 may be associated with the caller originating the voice command. Device 20 may also be associated with a party other than the caller originating the voice command. Links 42, 44 may include a conventional link capable of transporting data and signaling messages in two directions.

As described below, VS 16 may implement a service for executing a voice command from a caller, such as a voice command to manipulate a set of data, and providing the resulting response of the executed voice command, such as a different modified set of data, to a device designated by the caller. A variety of conventional schemes are available for placing a call to the service implemented by VS 16. In one embodiment, the caller may place a call to VS 16 by using calling device 12, 14 and a conventional dialing scheme. In such an embodiment, the caller may dial a telephone number that corresponds to VS 16, and PSTN 32 and/or Internet 34 may route the call to VS 16 based on the dialed digits and conventional AIN call routing schemes. In another embodiment, the caller may place a call to VS 16 by using a conventional speech recognition (SR) scheme. In such an embodiment, the caller may speak the name of the service into calling device 12, 14, and PSTN 32 and/or Internet 34 may route the call to VS 16 based on the spoken name and conventional call routing schemes based on SR.

In one embodiment, VS 16 may be located on PSTN 32. In this embodiment, PSTN 32 may route the call to NI 22 over a conventional switch and a conventional trunk line.

In another embodiment, VS 16 may be located on a network different than PSTN 32, e.g. Internet 34. In such an embodiment, PSTN 32 may include a PSTN gateway that may serve as an entrance to Internet 34. In such an embodiment, PSTN 32 may route the call to the PSTN gateway, and the PSTN gateway may then route the call to NI 22.

As shown in FIG. 1, Internet 34 may include an IP telephony server 46 for routing calls. IP telephony server 46 may include a variety of conventional components for processing and routing a call. For example, IP telephony server 46 may include a registrar 48 for storing addresses; a locator/proxy 50 for receiving and routing a call based on the addresses in the registrar 48; and, a redirector 52 for routing the call along an alternate route. IP telephony server 46 may include a SIP server. IP telephony server 46 may include an RTC.NET location/proxy server produced by Microsoft Corporation, Redmond, Wash. IP telephony server 46 may process a call using VoIP or another conventional protocol.

As previously indicated, VS 16 may implement a service for executing a voice command from a caller and providing the resulting response of the executed voice command to a device designated by the caller. As shown in FIG. 1, VS 16 may include a variety of speech processing components for interacting with the caller. VS 16 may include a voice markup language interpreter (VMLI) 24, an automatic speech recognition (ASR) module 26, and a text-to-speech (TTS) synthesizer 28. Operation of the service implemented by VS 16 can be based on a scheme that uses VMLI 24, ASR 26, and TTS 28 to manipulate a VRA 30 stored in database 18 during an interaction with a caller.

Generally, a VRA 30 may include one or more commands to be executed by VMLI 24 during an interaction with a caller. VRA 30 may be written in a conventional voice markup language (VML). Similar to the way in which a hypertext markup language (HTML) may be used to write a document designed to be viewed, a VML may be used to write a document designed to be heard. By using ASR 26 and TTS 28, VMLI 24 may render VRA 30 into an audio form for interaction with the caller.

As previously indicated, VRA 30 may be written in a conventional VML. VRA 30 may be written in the voice extensible markup language commonly known by the acronym VoiceXML. VRA 30 may also be written in the VML known as Speech Application Language Tags (SALT). VoiceXML is maintained by the World Wide Web Consortium (W3C) on the Internet at the uniform resource locator (URL) http://www.w3.org/TR/voicexml20. VRA 30 may include a script containing logic for processing voice commands. VRA 30 may be written in a VML based on a natural language, a grammar, or a combination of the foregoing. Information about grammars may be found at the URL http://www.w3.org/TR/grammar-spec. Generally, a grammar may include one or more pre-defined words relevant to an interaction between the caller and VS 16. The grammar may be based on Bachus Naur Form (BNF), a statistical language model (SLM), or another structure. The grammar may be particular to VRA 30. For example, a VRA 30 that includes commands for a calculator may be written in a VML based on a grammar having representations of numbers and mathematical operations. VRA 30 may be written in a public or proprietary grammar. For example, VRA 30 may be written in the proprietary Grammar Specification Language (GSL) or Grammar Extensible Markup Language (GrXML) of Nuance Communications Inc., Menlo Park, Calif. VRA 30 may be written using the programming languages Java and JavaScript of Sun Microsystems, Inc., Santa Clara, Calif.

As previously indicated, VMLI 24 may process a voice command from the caller by using ASR 26 and TTS 28 to manipulate VRA 30. ASR 26 may convert a voice response from the caller into a textual representation. For example, ASR 26 may convert a voice response from the caller into a symbolic representation in a VML, such as VoiceXML. ASR 26 may perform the conversion based on a conventional algorithm, including an algorithm based on a natural language or a grammar. TTS synthesizer 28 may convert data from VMLI 24 into a voice output. Data from VMLI 24 may include one or more words symbolically expressed in a VML, such as VoiceXML.

VS 16 may be designed to receive a variety of commands, including voice commands, and/or DTMF tone commands, and/or text commands. VS 16 may be designed to receive voice commands and DTMF tone commands defined by a context-free grammar or an application-specific grammar. VS 16 may also be designed to receive voice commands defined by a SLM. VS 16 may translate commands from their original form into a pre-defined range of text values generated by a grammar or an SLM. VS 16 may translate a data or textual command into the pre-defined range of text values by using a lexical parser. VS 16 may reject a command that does not correspond to the pre-defined range of text values. In one embodiment, VS 16 may generate an error message informing a caller that a non-conforming command has been received.

In one embodiment, calling device 12, 14 and/or another device in PSTN 32 and/or Internet 34 may include SR and TTS capabilities and may convert a voice command to a text value before transmitting the voice command to VS 16.

A variety of arrangements of ASR 26 and TTS synthesizer 28 are possible. As shown in FIG. 1, both ASR 26 and TTS synthesizer 28 may be hosted by the same VS 16. Alternately, ASR 26 and TTS synthesizer 28 may be hosted by different servers. In such an embodiment, VS 16 and VMLI 24 may access ASR 26 and/or TTS synthesizer 28 from a host server over a conventional network connection. Also, system 10, including VS 16, may include a plurality of ASRs 26 (not shown) and/or a plurality of TTS synthesizers 28 (not shown) based on a variety of different spoken languages, such as English and Spanish.

As shown in FIG. 1, VRA 30 may be stored on database 18. In one embodiment, VS 16 may access the VRA 30 by interacting with database 18 according to a conventional request-response scheme. In one embodiment, VS 16 may access VRA 30 by using a mechanism similar to or the same as HTTP for accessing documents written in HTML. In such an embodiment, VS 16 may provide an HTTP request for a particular VRA 30 and an associated grammar to database 18.

In another embodiment, VS 16 may access a VRA 30 having a particular feature by formulating a search query and providing that search query to a search engine in Internet 34. In such an embodiment, the search engine may search Internet 34 for the desired VRA 30 according to conventional schemes. Such schemes may be similar to those described in U.S. Patent Application Pub. No. 2002/0093944 to Shen et al., the contents of which publication are expressly incorporated by reference herein.

In one embodiment, VRA 30 may reside on VS 16 using file-based persistence. VS 16 may include a server or a servlet engine, such as a Java servlet engine, including a Jakarta Apache servlet engine produced by Sun Microsystems, Inc. For example, VS 16 may include a Jakarta Apache Tomcat server. The Tomcat server may be designed to serve static and dynamic VoiceXML content. Java code, JavaServer pages (JSPs), VoiceXML page(s), and grammar(s) may be persisted on the Tomcat server using file-based persistence. Grammar(s) for the VoiceXML pages may be embedded in the VoiceXML pages or may be precompiled.

VRA 30 may be stateful, meaning that VRA 30 may continuously reside on a particular host during an interaction with a caller. For example, the state of VRA 30 may be maintained on database 18, and VS 16 may repeatedly access VRA 30 from database 18 during an interaction with the caller. Alternately, the state of VRA 30 may be maintained on VS 16, and database 18 may regulate access to VRA 30. To accelerate access to VRA 30, VS 16 may store VRA 30 in a cache according to conventional schemes. Such schemes may be similar to those described in U.S. Pat. No. 6,353,836 to Bamford et al. and U.S. Pat. No. 6,370,615 to Percival, the contents of which patents are expressly incorporated by reference herein.

VS 16 may implement a variety of services that can execute a voice command from a caller and provide the resulting response of the executed voice command to a device designated by the caller. In one embodiment, VS 16 may implement a service to manipulate a set of data from the caller to obtain a different modified set of data and provide the modified set of data to a device designated by the caller. In one embodiment, VS 16 may be designed to execute an organizer application that allows a caller to manipulate data included in the organizer application using a VRA 30. In another embodiment, VS 16 may be designed to provide a textual representation of a voice command and/or the results of an executed voice command to a device designated by the caller.

An exemplary operation of VS 16 may be understood in the following manner with reference to FIG. 1. A caller may place a call to a service implemented by VS 16. The call may be routed by PSTN 32 and/or Internet 34 to VS 16. Upon receipt of an incoming call by NI 22, VS 16 may access a default VRA 30 for interacting with the caller. Default VRA 30 may include a command for generating a prompt to the caller to initiate an interaction between VMLI 24 and the caller. For example, default VRA 30 may include a command for VMLI 24 to prompt the caller to choose a service from a menu of available services.

Based on the command in the default VRA 30, VMLI 24 may use TTS synthesizer 28 to play a corresponding audio prompt for the caller. Thereafter, ASR 26 may convert the voice response of the caller into a symbolic representation in a VML associated with VRA 30.

Based on a match between the symbolic representation of the voice response and the commands included in the default VRA 30, VMLI 24 may identify a particular VRA 30 for processing a voice command from the caller. For example, in response to a caller's spoken choice of a calculator from a menu, of available services, VMLI 24 may access a VRA 30 associated with a calculator. VMLI 24 may then prompt, receive, process, and execute voice commands from the caller, e.g. voice commands to multiply two numbers, according to schemes described herein. Based on the commands in the accessed VRA 30, VMLI 24 may prompt the caller to designate a device to which to provide the resulting response of the executed voice command. For example, the caller may have commanded VS 16 to perform a multiplication problem, and VMLI 24 may prompt the caller to specify a device to receive the answer. Based on the response from the caller, VS 16 may route the resulting response to a device 20 designated by the caller over PSTN 32 and/or Internet 34 according to schemes described herein.

In one embodiment, VS 16 may route the resulting response to a device 20 designated by the caller and may persist or otherwise store the resulting response in internal memory and/or in database 18. In such an embodiment, VS 16 may process a subsequent voice command by retrieving and manipulating the results of the executed initial voice command in database 18. For example, as previously indicated, the caller may initially command VS 16 to perform a multiplication problem. VS 16 may execute the initial command and store the resulting response in database 18. Subsequently, the caller may command VS 16 to multiply the result of the initial multiplication problem by a number. VS 16 may execute the subsequent voice command by retrieving the results of the initial command from database 18 and manipulating the results according to schemes described herein.

Generally, VS 16 may execute a processed voice command and provide a resulting response of the processed voice command on a time scale similar to the time scale for receiving a voice command. For example, VS 16 may execute the processed voice and provide the resulting response to the device designated by the caller in real time, so that the caller may manipulate the resulting response with another contemporaneously-accessed application.

VS 16 may persist data generated during an interaction with a caller separately from data used to process a voice command. For example, VS 16 may persist data generated during an interaction with a caller in a database, a directory, and/or a file server other than that used to persist VRA 30. VS 16 may persist data in a database, a directory, and/or a file server that may reside on one or more computers in PSTN 32 and/or Internet 34. VS 16 may persist data in a relational database including a front end based on Java Database Connectivity (JDBC), Open Database Connectivity (ODBC), or Oracle Call Interface (OCI). VS 16 may also persist data in an object-oriented database or in a directory that can be implemented as a relational database with a Lightweight Directory Access Protocol (LDAP) front end.

In one embodiment, VS 16 may provide the results of an executed voice command to another application. For example, VS 16 may provide the results of an executed voice command to a VS associated with a different network. In such an embodiment, VS 16 may store the response of an executed voice command in internal memory and/or database 18.

As previously indicated, VS 16 may execute an organizer application that allows the caller to manipulate data included therein using a VRA 30. VS 16 may store data resulting from an interaction with the caller in internal memory and/or in the database 18 according to conventional schemes. To facilitate subsequent retrieval, VS 16 and/or database 18 may associate the data to be stored with information identifying the caller, such as username(s), password(s), account number(s) and/or other identifying information.

Depending upon the particular service selected by the caller, VS 16 or another conventional network device may perform a caller authentication scheme to enhance the integrity of the data that may be manipulated by the caller. In such an embodiment, the caller may be authenticated prior to being allowed to manipulate data. Conventional authentication schemes may be used. Such schemes may be similar to those described in U.S. Pat. No. 6,356,868 to Yuschik et al. and U.S. Pat. No. 6,122,357 to Farris et al., the contents of which patents are expressly incorporated by reference herein.

A variety of conventional schemes are available for routing the resulting response of an executed voice command to a designated device. VS 16, the database 18, a switch in PSTN 32, and/or IP telephony server 46 in Internet 34 may include a list of devices available for designation by the caller and addresses associated with those devices. The addresses may include IP addresses, office equipment (OE) numbers, telephone numbers, URLs, and/or other conventional address information. The addresses may be stored in an LDAP directory. VS 16 and system 10 may route the results to the address associated with the device 20 designated by the caller according to conventional call routing schemes.

Generally, VS 16 may prompt the caller to designate a device including at least one of a calling device, a display, an electronic mail account, a PC, a PDA, and a printer. In one embodiment, the resulting response of an executed voice command may be provided to a default device. For example, the resulting response may be provided to the calling device 12, 14 from which the caller originated the voice command. In such an embodiment, VMLI 24 may convert the resulting response to a voice output by using VRA 30 and TTS synthesizer 28. In another embodiment, the resulting response of an executed voice command may be provided to the calling device 12, 14 from which the caller originated the voice command and to a device 20 designated by the caller. In another embodiment, the resulting response may be directed to a control device associated with designated device 20. For example, based on a command from a caller to provide the resulting response to a printer, the resulting response may be provided to a personal computer (PC) operatively connected to the printer, thereby allowing the resulting response to be printed on the printer. In another embodiment, the resulting response may be provided to a Braille-compatible device, such as a Braille printer.

VS 16 may address a device 20 designated by a caller by using a variety of addressing schemes. For example, VS 16 use a SIP Uniform Resource Identifier (URI), an E164 telephone number, an Internet domain name, an Internet address, an HTTP URL, or another addressing scheme associated with the network on which device 20 resides. VS 16 may also use an addressing scheme associated with the network on which VS 16 resides. Since VS 16 and device 20 may reside on different networks, system 10 may include gateways to translate between different addressing schemes.

Generally, VS 16 may communicate with other servers using conventional store-and-forward technologies. For example, VS 16 may send data to a server running a web application via HTTP or another conventional protocol, such as Simple Object Access Protocol (SOAP), Remote Method Invocation (RMI), or Common Object Request Broker Architecture (CORBA); to a server running an email application via Simple Mail Transfer Protocol (SMTP); to Instant Messenger® clients via SIP messages; and to printers and other peripheral devices based on device drivers.

As previously indicated, the voice command and/or the resulting response may be provided to a PC and a PDA, among other devices 20. The service implemented by VS 16 may thus allow the caller to see, as well as hear, the resulting response of the executed voice command. In one embodiment, the resulting response may be provided to a PDA or similar device to synchronize the PDA according to conventional schemes.

As previously described, VS 16 may implement a variety of services that can execute a voice command from a caller to obtain a resulting response. In one embodiment, VS 16 may be designed to execute an organizer application that allows a caller to manipulate data included in the organizer application using a VRA 30. The organizer application may include a variety of different services, similar to the variety of services included on a conventional PDA. For example, the organizer application may include at least one of an account book for recording and modifying debits and credits; an address book for recording and modifying addresses; an alarm for recording and modifying an audible reminder; a date book for recording and modifying appointments; and, a memorandum book for preparing documents. The organizer application may also include a calculator for performing mathematical operations and a clock for reporting a current time. The organizer application may further include a search engine for searching a network for particular subject matter according to conventional schemes. VS 16 may process a voice command from the caller for the organizer application according to previously described schemes. In such an embodiment, a caller may access a range of services for manipulating data over a telecommunications network.

VS 16 may be designed to execute an address book VRA 30 capable of processing a voice command from a caller and sending an email message to an address included in the address book. In one embodiment, VS 16 may associate an address book with a particular caller and may store the address book in a database, a directory, and/or a file server according to schemes previously described herein. VS 16 may also be designed to receive an address book generated by a different application. For example, VS 16 may be designed to receive and store an address book generated by an email application. An address book VRA 30 may be used by a caller to read an email message, extract an email address, and store the extracted email address in an address book associated with the caller.

VS 16 may be designed to execute a calculator VRA 30 capable of performing unary operations, binary operations, and/or a macroinstruction. The unary operations may include mathematical operations having a single argument, such as logarithms, powers, roots, statistical functions, and trigonometric functions. The binary operations may include mathematical operations having two arguments, such as addition, subtraction, multiplication, and division. The macroinstruction may include an instruction for performing a multi-step calculation, such as a conversion, a gratuity, an investment, and a mortgage. For example, the macroinstruction may include an instruction for performing a conversion between a first unit system and a second unit system, such as a dollars-to-yen conversion or a metric-to-English conversion, and an instruction for calculating a gratuity based on a designated percentage. The calculator application may be designed to prompt a caller to provide one or more inputs for performing a macroinstruction. For example, the calculator application may be designed to calculate a gratuity by prompting a caller to provide a bill amount, a tax rate, a gratuity percentage, and/or other information. The calculator application may be implemented in a VRA 30 having a specific grammar according to schemes described herein.

Generally, VMLI 24 may process a voice command for a calculator VRA 30 according to previously described schemes. More specifically, VMLI 24 may process the voice command by mapping the voice command onto a pre-defined string. The pre-defined string may be included in VRA 30 and/or in a grammar for processing VRA 30. For example, for a binary operation, VMLI 24 may map the voice command to a string such as "variable-1 operation variable-2," in which variable-1 and variable-2 represent numbers and operation represents a desired mathematical operation. After identifying the elements of the string, VMLI 24 may execute the voice command by passing the elements of the string to an engine, such as the previously identified servlet engine.

FIG. 2 is a flow chart illustrating a method for processing a voice command from a caller in accordance with an exemplary embodiment of the present invention. Operation of system 10 shown in FIG. 1 may be understood in the following manner with reference to FIG. 2. A caller may use calling device 12, 14 to place a call to one or more services supported by VS 16. VS 16 may receive the call (100 in FIG. 2). Upon receiving the call, VS 16 may access from database 18 a VRA 30 for interacting with the caller (110 in FIG. 2). VS 16 may interact with the caller by using VMLI 24, ASR 26, TTS 28, and VRA 30 (120 in FIG. 2). During a voice interaction with the caller, VS 16 may receive a voice command from the caller. For example, VS 16 may receive a voice command to manipulate a set of data (130 in FIG. 2). VS 16 may process the voice command using VMLI 24, ASR 26, TTS 28, and VRA 30 (140 in FIG. 2). VS 16 may then execute processed voice command. For example, VS 16 may manipulate the set of data to obtain a different modified set of data (150 in FIG. 2). Subsequently, VS 16 may receive a voice command from the caller designating a device 20 to which to route the modified set of data (160 in FIG. 2). VS 16 may then provide the original voice command and/or the modified set of data to designated device 20 (170 in FIG. 2).

The services described herein for executing a voice command from a caller may be adapted to a variety of applications. In one embodiment, VS 16 may concurrently process a plurality of voice commands from one or more callers, and may concurrently provide the results of the plurality of voice commands to different devices designated by the caller(s). Concurrent access may be implemented by using schemes similar to those described herein, as well as conventional call processing schemes. In another embodiment, VS 16 may be capable of processing an input based on voice, an input based on DTMF tone(s), and/or an input based on text. For example, the caller may respond to a prompt from VMLI 24 by speaking into calling device 12, 14, depressing a key on calling device 12, 14, providing a textual representation of a command, or performing a combination of the foregoing. VS 16 may be designed so that a response based on a particular DTMF tone(s) may instruct VS 16 and/or VMLI 24 to execute a particular command. For example, VS 16 may be designed so that depressing a particular key on a keypad of calling device 12, 14 may cause VS 16 to provide the resulting response of an executed voice command to a particular device. VS 16 may be designed to process a data command according to conventional schemes. For example, VS 16 may be designed to process a data command originating from calling device 12, 14, a PDA, or another device.

As previously indicated, VS 16 may receive a command from a caller that can include at least one of a voice command, a DTMF tone command, and a text command. As also previously indicated, VS 16 may execute the command and provide a resulting response of the executed command to a device designated by a caller. Generally, VS 16 may provide the resulting response in a medium that is similar to or different than the medium of command. For example, based on receiving a voice command, VS 16 may provide an audio resulting response, such as an audio response directed to the caller, and/or a printed resulting response, such as a printed response directed to a printer.

As shown in FIG. 1, IP telephony server 46 can include a conventional call control mechanism 54. As previously indicated, VS 16 may implement an address book application. VS 16 may be designed to route a call to an address in the address book based on a voice command from the caller. In such an embodiment, VS 16 may process the voice command from the caller according to the previously described schemes, and then provide the call to call control mechanism 54 for routing according to conventional schemes. VS 16 may provide call control mechanism 54 with an address for routing the call. The address may include an IP address, an OE number, a telephone number, a URL, and/or other conventional address information for routing a call.

A variety of arrangements of call control mechanism 54 are possible. For example, as previously indicated, call control mechanism 54 may be hosted by IP telephony server 46. Alternately, call control mechanism 54 may be hosted by a different server, including a server located on PSTN 32 and/or on Internet 34.

The schemes described herein are not limited to a particular hardware or software configuration; they may find applicability in many computing or processing environments. The schemes can be implemented in hardware or software, or in a combination of hardware and software. The schemes can be implemented in one or more computer programs, in which a computer program can be understood to include one or more processor-executable instructions. The computer program(s) can execute on one or more programmable processors, and can be stored on one or more storage media readable by the processor, including volatile and non-volatile memory and/or storage elements. The programmable processor(s) can access one or more input devices to obtain input data and one or more output devices to communicate output data.

The computer program(s) can be implemented in high level procedural or object oriented programming language to communicate with a computer system. The computer program(s) can also be implemented in assembly or machine language. The language can be compiled or interpreted.

The computer program(s) can be stored on a storage medium or a device (e.g., compact disk (CD), digital video disk (DVD), magnetic disk, internal hard drive, external hard drive, random access memory (RAM), or redundant array of independent disks (RAID)) that is readable by a general or special purpose programmable computer for configuring and operating the computer when the storage medium or device is read by the computer to perform the schemes described herein.

The schemes described herein are not limited to a voice server executing a voice application. Rather, the schemes described herein may be executed by a media server. The media server may include at least one machine capable of processing an instruction. For example, the media server may include a machine including a processor, such as a computer or a server. The media server may process commands from a caller by accessing a media platform that may include scripts containing logic for executing the commands. The scripts may be written in a VML, such as VoiceXML and SALT. The media platform may process voice commands, text commands, and/or DTMF tones. The media platform may include a variety of speech processing capabilities, including SR and TTS synthesis capabilities. The media platform may also be capable of data playback. For example, the media platform may be capable of playing audio files, such as wave files. The audio files may be recorded by the media server and/or the media platform and may be pre-recorded by another entity.

The media platform may analyze a variety of input streams. For example, the media platform may analyze an input stream containing voice data and DTMF tones. The media platform may analyze an input stream including only voice data, in which DTMF tones are included as part of the signaling protocol for establishing and tearing down a connection with a caller. The media platform may analyze an input stream including data or text commands from an HTTP client. Additionally, the media platform may poll an application server that may be receiving data or text commands during a connection between the caller and the media server executing the media platform.

A caller may access the media server from a range of different devices. These devices include a wireline telephone located in PSTN 32, a wireless telephone located in PSTN 32 with or without a WAP interface, an Internet-based telephone, an Internet-based Instant Messenger, an Internet-based PDA, a desktop computer, and/or a network based printer.

The schemes described herein are not limited to particular physical layers, data link layers, network layers, transport layers, session layers, and/or presentation layers in the open system interconnection reference model (OSI-RM). Rather, the schemes described herein can be implemented on an application layer, where an application layer can be defined as the highest layer in the OSI-RM model.

Moreover, the schemes described herein are not limited to particular telecommunication protocols. Rather, the schemes described herein can be implemented using a variety of call control, messaging, signaling, data transport, and telephony protocols.

While the schemes described herein have been particularly shown and described with reference to the exemplary embodiments thereof, those of ordinary skill in the art will understand that various changes may be made in the form and details described herein without departing from the spirit and scope of this disclosure. Those of ordinary skill in the art will recognize or be able to ascertain many equivalents to the exemplary embodiments described herein by using no more than routine experimentation. Such equivalents are intended to be encompassed by the scope of this disclosure and the appended claims.

The invention claimed is:

1. A method including:
   receiving from a caller a voice command to access a first application associated with a first device,
   receiving from the caller a voice command to manipulate a set of data stored prior to the caller having accessed a system implementing the method,
   using a voice-recognition application, processing the voice command at least in part by converting the voice command to a symbolic command in a voice markup language,
   obtaining a modified set of data by performing at least one of adding to, deleting and editing at least a subset of the set of data, wherein obtaining the modified set of data includes executing the symbolic command,
   formatting the modified set of data for a second device designated by the caller thereby obtaining a formatted set of data,
   providing the formatted set of data to the second device designated by the caller,
   providing the formatted set of data to a second application associated with the second device in generally real time, the second application being accessed contemporaneously with the first application, and
   providing a user interface to manipulate the formatted set of data using the second application.

2. The method of claim 1, wherein receiving includes:
accessing a voice-recognition application based on at least one of a grammar, a natural language, and a voice markup language.

3. The method of claim 1, wherein providing includes:
directing the formatted set of data to the device designated by the caller based on a protocol including at least one of a Public Switched Telephone Network (PSTN) protocol and an Internet protocol.

4. The method of claim 1, wherein providing includes:
directing the formatted set of data to at least one of a calling device, a display, an electronic mail account, a personal computer (PC), a personal digital assistant (PDA), and a printer.

5. The method of claim 1, wherein providing includes:
providing the formatted set of data to a device from which the caller originated the voice command.

6. The method of claim 1, wherein:
formatting includes converting the modified set of data to a voice output, and
providing includes providing the voice output to the device from which the caller originated the voice command.

7. The method of claim 1, further comprising:
receiving a voice command from the caller designating the device to receive the formatted set of data.

8. The method of claim 1, further comprising:
providing an organizer application that allows the caller to manipulate data therein using the voice-recognition application, wherein the data in the organizer application comprises the set of data stored prior to the caller having accessed the system implementing the method.

9. The method of claim 1, further comprising:
providing an organizer application that allows the caller to manipulate data included in at least one of an account book, an address book, an alarm, a clock, a date book, and a memorandum book using the voice-recognition application, wherein the data comprises the set of data stored prior to the caller having accessed the system implementing the method.

10. The method of claim 1, further comprising:
providing an organizer application that allows the caller to manipulate data included in a calculator, the calculator being capable of performing at least one of a macroinstruction, a unary operation, and a binary operation, wherein the data comprises the set of data stored prior to the caller having accessed the system implementing the method.

11. The method of claim 1, further comprising:
concurrently performing the method of claim 1 for a plurality of callers.

12. The method of claim 1, wherein the first device is a first voice server, and the second device is a second voice server.

13. The method of claim 1, further comprising:
receiving from a caller a voice command to access the second application,
providing the formatted set of data to the caller,
receiving a voice command from the caller to modify the formatted set of data by performing at least one of adding to, deleting, and editing at least a subset of the formatted set of data, and
modifying the formatted set of data according to the voice command.

14. The method of claim 1, further comprising:
receiving a request from the caller to contemporaneously access the second application, wherein the first device is a first voice server, and the second device is a second voice server,
receiving a voice command from the caller to modify the formatted set of data by performing at least one of adding to, deleting, and editing at least a subset of the formatted set of data, and
modifying the formatted set of data utilizing the second voice server according to the voice command.

15. A processor program stored on a processor-readable medium and comprising instructions to cause a processor to:
receive from a caller a voice command to access a first application associated with a first device,
receive from the caller a voice command to manipulate a set of data stored prior to the caller having accessed the program,
using a voice-recognition application, process the voice command at least in part by converting the voice command to a symbolic command in a voice markup language,
obtain a modified set of data by performing at least one of adding to, deleting and editing at least a subset of the set of data, wherein obtaining the modified set of data includes executing the symbolic command,
format the modified set of data for a second device designated by the caller thereby obtaining a formatted set of data,
provide the formatted set of data to the second device designated by the caller in generally real time,
provide the formatted set of data to a second application associated with the second device, the second application being accessed contemporaneously with the first application, and
manipulate the formatted set of data using the second application, the formatted set of data being manipulated based on input from a user.

16. The processor program of claim 15, wherein the instructions to provide include instructions to:
direct the formatted set of data to at least one of a calling device, a display, an electronic mail account, a PC, a PDA, and a printer.

17. A system comprising:
a first voice server comprising:
a plurality of applications,
an interface for receiving from a caller a voice command to select a first application from among the plurality of applications and manipulate a set of data stored prior to the caller having accessed the first voice server using the selected application,
a voice-recognition application for processing the voice command at least in part by converting the voice command to a symbolic command in a voice markup language, and
a voice markup language interpreter for
obtaining a modified set of data by performing at least one of adding to, deleting and editing at least a subset of the data, wherein obtaining the modified set of data includes executing the symbolic command, and
formatting the modified set of data for a device designated by the caller thereby obtaining a formatted set of data,
a router for providing the formatted set of data to the device designated by the caller; and
a second voice server configured to:
receive the formatted set of data from the first voice server in generally real time, provide the formatted set of data to a second application associated with the second voice server, the second application being accessed contemporaneously with the first application, and manipulate the formatted set of data using the second application, the formatted set of data being manipulated based on input from a user.

18. The system of claim 17, wherein the router is designed to direct the formatted set of data to at least one of a calling device, a display, an electronic mail account, a PC, a PDA, and a printer.

19. A method comprising:

prompting a caller to choose a first service from a plurality of available services capable of modifying a set of data stored prior to the caller having accessed a system implementing the method, accessing a voice-recognition application in response to a service chosen by the caller, receiving from the caller a voice command to manipulate the set of data, using the voice-recognition application, processing the voice command at least in part by converting the voice command to a symbolic command in a voice markup language, obtaining a modified set of data by performing at least one of adding to, deleting and editing at least a subset of the set of data, wherein obtaining the modified set of data includes executing the symbolic command, formatting the modified set of data for a device designated by the caller thereby obtaining a formatted set of data, providing the formatted set of data to the device designated by the caller, providing the formatted set of data to a second service associated with the second device in generally real time, the second service being accessed contemporaneously with the first service, and manipulating the formatted set of data using the second application based on input from a user.

20. The method of claim 19, wherein providing includes:

directing the formatted set of data to at least one of a calling device, a display, an electronic mail account, a PC, PDA, and a printer.

21. The method of claim 19, further comprising:

concurrently performing the method of claim 19 for a plurality of callers, wherein two callers choose different services.

22. A method including:

receiving from a caller a command to manipulate a set of data stored prior to the caller having accessed a system implementing the method, using a media platform, processing the command at least in part by converting the voice command to a symbolic command in a voice markup language, obtaining a modified set of data by performing at least one of adding to, deleting and changing at least a subset of the set of data, wherein obtaining the modified set of data includes executing the symbolic command, formatting the modified set of data for a device designated by the caller thereby obtaining a formatted set of data, providing the formatted set of data to the device designated by the caller in generally real time, providing the formatted set of data to a contemporaneously-accessed application associated with the device designated by the caller, and manipulating the formatted set of data using the contemporaneously-accessed application based on input from a user.

23. The method of claim 22, wherein receiving includes:

receiving at least one of a voice command, a dial tone modulation frequency (DTMF) tone command, and a text command.

24. The method of claim 22, wherein receiving includes:

receiving a text command from the caller based on an Internet protocol.

25. The method of claim 22, wherein processing includes:

using a media platform including a lexical parser, processing a text command.

26. The method of claim 22, wherein providing includes:

directing the formatted set of data to at least one of a calling device, a display, an electronic mail account, a PC, a PDA, and a printer.

27. The method of claim 22, wherein formatting includes:

based on the modified set of data, generating an output in a medium different than that of the command.

* * * * *